United States Patent

[11] 3,633,420

[72] Inventor: Heinz Holzem
 Monchengladbach, Germany
[21] Appl. No.: 802,940
[22] Filed: Feb. 27, 1969
[45] Patented: Jan. 11, 1972
[73] Assignee: Pierburg Luftfahrtgerate Union G.m.b.H.
 Neuss am Rhein, Germany
[32] Priority: Aug. 19, 1968
[33] Germany
[31] P 17 98 080.2

[54] CONTINUOUS FLOW METERING AND CONTROL APPARATUS
15 Claims, 5 Drawing Figs.

[52] U.S. Cl. ................................................. 73/199,
 73/197, 318/335, 417/1, 417/293
[51] Int. Cl. ............................................... G01f 3/10
[50] Field of Search ........................................ 73/194,
 197, 199, 205; 103/35, 11; 221/71; 318/335, 481

[56] References Cited
UNITED STATES PATENTS
2,080,183  5/1937  Pigott ........................... 73/199
FOREIGN PATENTS
278,992  10/1930  Italy .............................. 73/197

Primary Examiner—Richard C. Queisser
Assistant Examiner—Marvin Smollar
Attorneys—Curt M. Avery, Arthur E. Wilfond, Herbert L. Lerner and Daniel J. Tick ABSTRACT: The invention relates to apparatus for providing substantially immediate flow measurement and/or flow control. The apparatus incorporates a positive displacement flow meter in the form of a gear pump the speed of which is controlled in such a way that the pressure difference between the inlet and the outlet of the pump is held at zero. This pressure difference is sensed by both a proportional sensor and an integral sensor and their joint output signal is used to control a motor which drives the gear pump.

CONTINUOUS FLOW METERING AND CONTROL APPARATUS

The invention relates to a flowmeter and flow controller to give immediate and continuous measurement and control of a fluid flow, using a displacement-type flow-measuring device, herein referred to as a "displacement flowmeter," the speed of which is controlled in such a way that the pressure difference between the inlet and outlet of the displacement flowmeter is held at the value zero.

It is known, for measuring the volume rates of flow of flowing fluids, liquid or gaseous, to use pumps of the positive displacement type. The pump is installed in the pipe line and driven in rotation by the flowing fluid. The resulting speed of the pump is taken as the measure for the volume rate of flow. This method of measuring flow is used in particular in the presence of low Reynold's numbers, which make it difficult to use hydrodynamic flowmeters, for example, when the rate of flow is less than 10 liters per hour.

In devices of the known kind the power required for overcoming the friction in the rotating flowmeter is taken from the flowing fluid. Within a certain limit of accuracy the speed of the rotating flowmeter is a measure for the volume rate of flow. However the fact that a certain amount of power is required for driving the flowmeter in this way has the result that a pressure difference arises between the inlet and outlet of the flowmeter, and in consequence there often occurs a gap loss which is not negligible. Under these circumstances the speed of the flowmeter is not accurately proportional to the rate of flow of the fluid, particularly at very low rates of flow. A further disadvantage of this arrangement is that it is often not possible to exceed a certain pressure difference, for practical reasons, and consequently there is only a limited field of application for displacement-type flowmeters in the measurement of flow.

In order to obtain the necessary steady and sufficiently accurate measurement, using this method, various instruments have been developed in which the displacement-type flowmeter is driven to some extent by means of an auxiliary drive system, which is controlled hydraulically and mechanically so as to reduce the pressure difference between the inlet and outlet of the displacement flowmeter as nearly as possible to zero. The purpose of this is to reduce as far as possible the gap loss, which impairs the accuracy of measurement, and at the same time to eliminate as far as possible any extra resistance to flow through the part of the pipe where the instrument is installed. German Pat. Specification No. 534 746 describes a flowmeter using this principle. The flowmeter has two lobed rotors the speed of which is controlled in response to a differential manometer so as to reduce the pressure difference at the inlet and outlet of the flowmeter to almost zero. The lobed rotors are positively connected with pinion wheels which are themselves driven in rotation by the flow of a liquid delivered by a pump, whose speed is governed by the instrument controller. This known arrangement requires an auxiliary flow circuit for driving the pinions and the lobed rotors, so as to equalize the pressures at inlet and outlet. The flow of fluid through this auxiliary circuit is controlled by a valve which responds to the pressure difference across the displacement flowmeter. The arrangement has the disadvantage, in the first place, that it is necessary to provide an auxiliary flow circuit with its own pump. But a second disadvantage is that the displacement flowmeter involving lobed rotors gives an uneven flow, that is to say the flow is to some extent pulsating, so that the pressure difference also pulsates and this introduces irregularities in the control of the auxiliary flow circuit.

German Pat. Specification No. 1 147 767 describes a volumetric flow-meter in which the pressures at inlet and outlet of the displacement flowmeter are constantly equalized by means of a measurement chamber which has moveable separation walls. A pressure drop is used to repeatedly fill the chamber with a particular volume of fluid, and empty it again. A pump is installed in the pipe carrying the fluid, the pump being driven by the flow of fluid. This pump is positively or frictionally connected to volumetric flowmeter situated just downstream of the pump. A bypass contains a valve which responds to the pressure difference and admits, from the bypass upstream of the pump, a flow of fluid to the chamber upstream of the flowmeter sufficient to equalize the pressures in the chambers upstream and downstream of the flowmeter. This known instrument is costly because it uses a hydraulic and mechanical arrangement for controlling the speed of the flowmeter. Moreover it is unsuitable for making immediate measurements in the first place because it involves considerable hydraulic inductance, that is to say the inertia of the flowing fluid introduces undesirable disturbances when the rate of flow changes. A further disadvantage is that the type of displacement flowmeter used contains oval wheels, which are manufactured only down to a standard connection diameter of 10 mm. In the presence of low rates of flow these oval wheels rotate too slowly to give a continuous and immediate indication of the rate of flow, that is to say they introduce inaccuracies. Flowmeters of this type provide a pulsating flow, due to their construction, and this results in a pulsating pressure difference.

The object of the present invention is to remove the disadvantages of the known flowmeters and to provide a flowmeter and/or flow controller capable of delivery of an accurate and immediate measured value, or controlling quantity, even in the presence of very low rates of flow and within brief periods.

In accordance with the invention, apparatus for providing substantially immediate flow measurement and/or flow control comprises a positive displacement flowmeter in the form of a gear pump the speed of which is controlled in such a way that the pressure difference between the inlet and the outlet of the pump is held at zero, the gear pump cooperating with a pressure difference sensor system containing both a proportional pressure difference sensor and an integral pressure difference sensor, the output signal delivered by the pressure difference sensor being used to control a motor which drives the gear pump.

The use of a gear pump as the displacement flowmeter has the advantage that this kind of pump has a very constant rate of flow/speed curve, that is to say the flow of fluid hardly pulsates at all, and consequently the pressure difference, which is the controlled variable, remains very steady. Furthermore a gear pump can be manufactured down to very small dimensions, due to its simplicity of construction, so that instruments can be made for measuring very low rates of flow.

For obtaining measurement and control of flow down to very low flow rates and with the greatest possible accuracy, the instrument has a proportional pressure difference sensor and an integral pressure difference sensor. In view of the very small dimensions of the gear pump it has been found advantageous to construct the gear pump and the pressure difference measuring device together to form a single structural unit. The proportional and integral pressure difference sensors can be accommodated hydraulically in series in a bypass duct which connects together ducts immediately upstream and downstream of the gear pump. The construction of the instrument as a single unit has the further advantage that measurement accuracy is improved because only a short bypass duct is needed. The hydraulic inductance is therefore tolerably little.

Preferably, for the integral measurement of pressure difference, a free piston is used in the bypass duct. If the free piston has the same density as the fluid, with the result that the piston is shifted along the bypass duct by even a very small pressure difference. For proportional measurement of the pressure difference the bypass duct contains a hydrodynamic resistor attached to a housing of the apparatus by a spring.

Electronic control of the motor driving the gear pump gives a control of pump speed which is almost without inertia. The signals for this control may be delivered by two photoelectric devices which receive light from a light source. The piston and the hydrodynamic resistor are interposed between the light source and the photoelectric devices in such a way that when the piston and the hydrodynamic resistor move, responding to the pressure difference, the flow of light received by the photoelectric devices changes, and consequently their output signals change, in dependence on the differential pressure change. Interposed between the piston and its photoelectric device there is a slotted plate, and another slotted plate is interposed between the hydrodynamic resistor and its photoelectric device. The photoelectric devices are preferably photoresistances. The influences of the proportional and integral pressure difference sensors in adjusting the pressure difference can be varied to suit the particular operating conditions, by suitably choosing the effective lengths of the slots behind the piston and behind the hydrodynamic resistor, and by suitably choosing the photoresistances. In many applications it is advantageous to use with the hydrodynamic resistor a slot of less effective length than that of the slot behind the piston, to the effect that although the hydrodynamic resistor moves at approximately the same speed as the piston, a more rapid change is produced in the flow of light reaching the photoelectric device behind the hydrodynamic resistor than is produced in the flow of light reaching the photoelectric device behind the piston.

It should be observed that the hydrodynamic resistor's photoresistance delivers a signal which is proportional to the pressure difference, whereas the piston's photoresistance delivers a signal which is proportional to the time integral of the pressure difference. There may be subtracted, from the sum of these two signals, a signal delivered by a tachometer attached to the motor which drives the gear pump. The difference signal formed in this way is fed, over an amplifier, to the motor, so as to control the motor speed to equalize the pressures, that is to say to reduce the pressure difference to zero.

The use of photoresistances allows the electronic control part of the instrument to be of quite simple construction, because only DC current is necessary.

The advantage obtained by using a slot of shorter effective length behind the hydrodynamic resistor is that the proportional measurement is more rapidly effective than the integral measurement.

An apparatus in accordance with the invention is illustrated by way of example in the accompanying drawings, in which.

Figure 1:
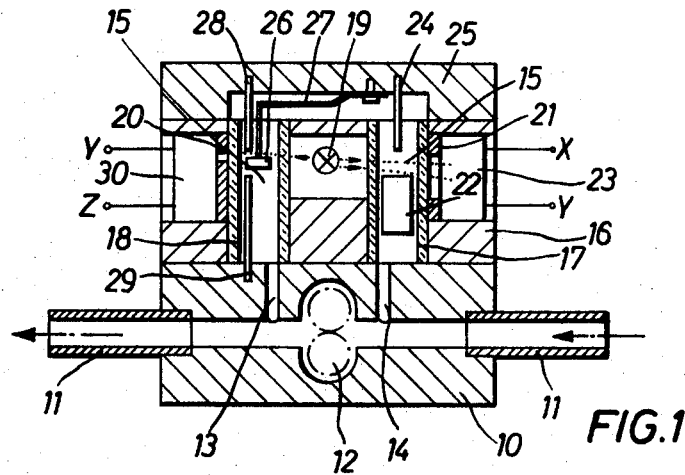
FIG. 1 is a section through the gear pump with both sensors.

FIG. 1 shows the constructional unit, which consists essentially of three parts. There is a base 10 containing a gear pump 12 and connected to flow pipes 11. Branching away from the flow duct, quite near the inlet and outlet chambers of the gear pump, and extending at right angles to the flow duct, there are two drillings 13 and 14 for measuring the pressure. The drillings 13, 14 are connected respectively to the two arms of a U-shaped bypass duct 15, which is kept as short as possible so as to minimize hydraulic inductance. The drillings 13 and 14 are situated very near the gear pump and therefore detect only the pressure difference across the gear pump, and not the extra pressure drop produced by the flow duct. The two arms of the bypass duct consist of transparent tubes 17 and 18 mounted parallel to each other in the middle part 16 of the housing. Between the transparent tubes there is a light source 19. Outside each transparent tube, that is to say at the side away from the light source, there are slotted plates 20, and 21. For measuring the time integral of the pressure difference, the transparent tube 17 contains an opaque free piston 22, capable of moving freely along the tube. The piston 22 has the same density as the fluid. Behind the slotted plate 21 there is a photoresistance 23. Movement of the piston 22 changes the amount of light reaching the photoresistance 23. The construction according to the invention ensures that the piston 22 is shifted even by very small pressure differences, of approximately 0.02 mm. water gauge. Due to the fact that the piston has the same density as the fluid, the distance moved by the piston is the same as the distance moved by the fluid in the tube 17, and this is equal to the time integral of a function of the pressure difference. The piston remains stationary only if the pressure difference is less than 0.02 mm. water gauge, a pressure difference which is practicably negligible. Above the piston there is a mechanical stop 24 projecting inwards into the tube 17. This limits the piston travel so that any pressure surge which might occur in the inlet duct to the pump cannot carry the piston right past the slot 21. The mechanical stop is necessary because if the piston were to move right past the slot light would again fall on the photoresistance, producing an undesired reversal of the sensing effect.

The connecting duct between the two transparent tubes 17 and 18 is in the form of a recess worked into the cover 25 of the housing. For the purpose of obtaining a proportional sensing of the pressure difference, the transparent tube 18 contains a hydrodynamic resistor 26 mounted on a spring 27 the other end of which is attached to the housing cover 25. The flow produced by a pressure difference shifts the hydrodynamic resistor 26 along the tube 18 until the spring force exactly counteracts the dynamic thrust. Due to the fact that the slot behind the hydrodynamic resistor 26 is comparatively short, the hydrodynamic resistor needs to travel only a short distance to produce a response in its photoresistance, and consequently the instrument responds very quickly to small differences in the flow velocity through the bypass. Hydraulic inductance therefore has very little effect on the controlling action.

There is no contact between the hydrodynamic resistor and the surface of the tube 18. The hydrodynamic resistor therefore works without hysteresis. There are two limiting stops 28 and 29 which limit the travel of the hydrodynamic resistor, to protect it from excessive flow surges, and to prevent reversal effects, that is to say to prevent the hydrodynamic resistor from wandering all the way past the slot 20. Due to the fact that, in the present example, the slot 20 is considerably shorter than the slot 21, in regard to effective length, the photoresistance behind the hydrodynamic resistor reacts with more variation in its response in proportion to the motion of the hydrodynamic resistor 26 than the photoresistance behind the piston 22, even though the hydrodynamic resistor 26 is moving at approximately the same velocity as the piston 22. The purpose of this difference in reactions is to ensure that the proportional reaction of the system is correctly timed in relation to the integral reaction, this correct timing being necessary in order to obtain a good control stability.

Should air bubbles occur in the fluid in the bypass, these must be removed to stabilize the control process. Air bubbles cause the gear pump speed to vary irregularly. To remove the bubbles it is merely necessary to interrupt the current supply to the motor briefly, which can be done by extinguishing the lamp 19 briefly. The gear pump 12 remains stationary and the pressure difference drives the air bubbles along through the annular gap between the piston 22 and the tube 17, and past the hydrodynamic resistor 26 and so out to the outlet side of the gear pump.

The two photoresistances 23 and 30 deliver signals for electronically controlling the gear pump speed, over the electric connections X, Y, and Y, Z.

Figure 2:
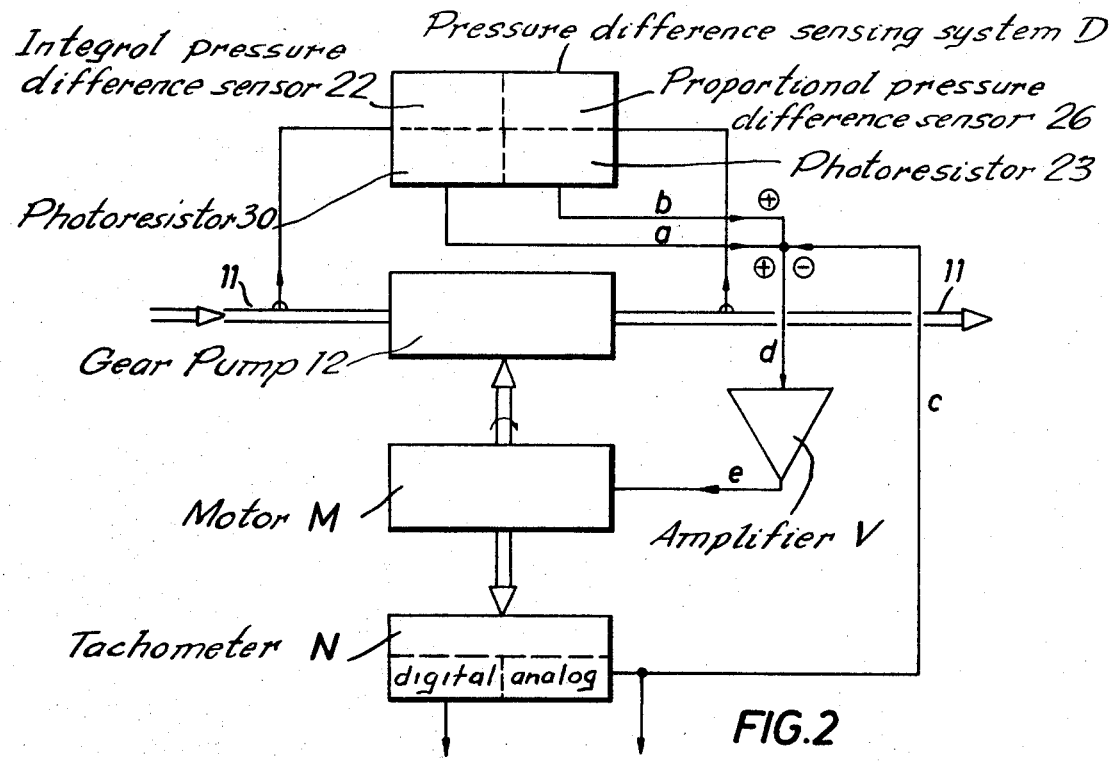
FIG. 2 is a block diagram showing the entire measurement system.

With reference to FIG. 2, considered in conjunction with FIG. 1, the pressure difference sensor D delivers a signal $a$, obtained from the photocell 30, which is proportional to the pressure difference, and a signal $b$, obtained from the photocell 23, proportional to the time integral of the pressure difference. From the sum $a+b$ of these two signals there is subtracted a signal $c$ which is delivered by a tachometer N attached to the motor M which drives the gear pump 12 through a positive drive connection. The speed of the motor M is proportional to the speed of the gear pump 12. The difference signal $d$ is fed over an amplifier V to the motor M, as the motor input power $e$.

If the motor speed changes due to some external interference, for example, a variation in the supply current, or because the frictional resistance of the gear pump has changed, then the system compensates for this as follows. Let us assume that the combined signal $a+b$ remains constant. The signal $d$ will therefore change only if the signal $c$ changes. Suppose that the signal $c$ decreases, for example, due to increased friction in the gear pump. The signal $d$ therefore increases, increasing the driving power $e$, so that the extra friction in the gear pump is immediately compensated by extra driving power supplied to the motor. From the block diagram in FIG. 2 it will be seen that the gear pump speed is proportional only to the sum of the two signals $a$ and $b$. This satisfies the requirement, in the present example, that the pressure difference must be the controlled variable and the gear pump speed the manipulated variable.

Assuming that initially the gear pump speed has become stabilized at a particular value, as soon as a pressure difference occurs the hydrodynamic resistor responds to the resulting gap flow through the gear pump, for example, from the inlet towards the outlet. The hydrodynamic resistor produces a signal $a$ which speeds up the motor. It is important to ensure that the motor speed does not increase so far that the gap flow reverses direction. This is prevented in that just before the pressures have become equalized the hydrodynamic resistor responds by reducing the excess power which has been fed to the motor for its acceleration. The similar thing occurs when the speed of the motor is being reduced by a signal from the hydrodynamic resistor.

The proportional part therefore acts to stabilize the gear pump speed. However it should be observed that the signal $c$ varies directly with the motor speed, and the signal $d$ fed to the amplifier must always have a positive value. If this requirement were to be satisfied by increasing the value of the signal $a$, there would result a residual pressure difference, which is undesired. This residual pressure difference is removed by an additional automatic trimming effect produced by the integral part of the pressure difference sensor system, whose signal $b$ adopts the steady-state value of signal $a$. To obtain this balancing effect the response speed of the integral part must be much less than that of the proportional part, so that the controlling influence of the hydrodynamic resistor is always dominant. This is ensured, as already mentioned, by the fact that the hydrodynamic resistor cooperates with a shorter slot, compared to the integrating free piston.

Figure 3:
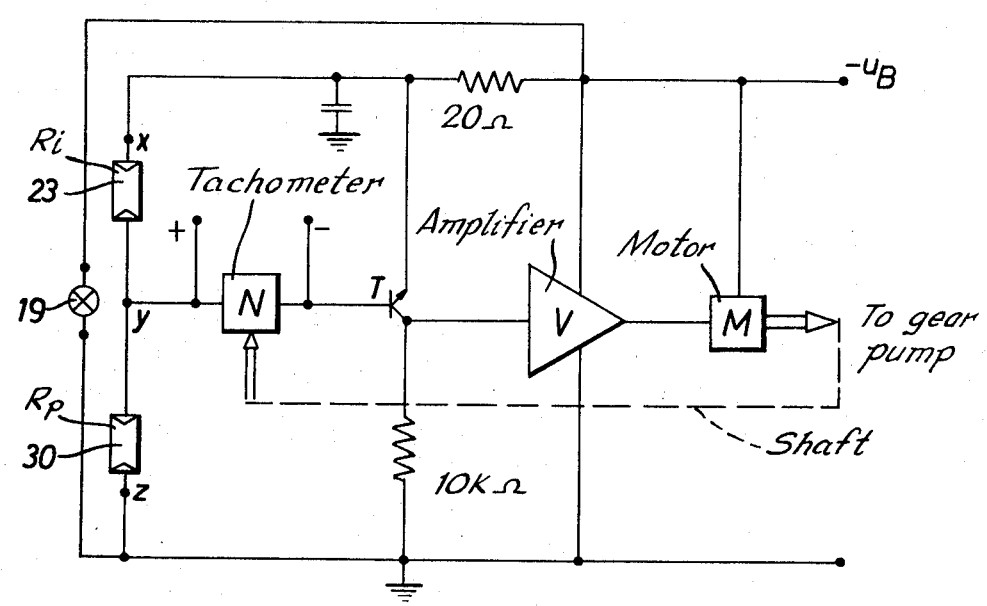
FIG. 3 is an electric circuit of the electronic controls for the apparatus.

In view of the fact that the conductances of the photoresistance increase with increasing radiation flux, it is advantageous to connect the photoresistances 23 and 30 so that they form a base voltage divider, as shown in FIG. 3. The photoresistance 23 is connected, over a tachometer (speed-signal feedback) N to the base and the emitter of an N-P-N transistor which precedes the amplifier V. The photoresistance 23 can have a considerably lower resistance, compared to the photoresistance 30, due to the larger area of the slot 21. Furthermore the integral response of the photoresistance 23 has the effect of largely compensating drift in the supply voltage, and also position errors of the hydrodynamic resistor 26, and also compensates temperature drift in the amplifier. The advantage obtained is that both the amplifier and the power supply can be of very simple construction. Furthermore, due to the fact that the piston 22 moves in response to extremely small pressure differences, any offset in the intensity of the light is also effectively compensated.

The base current necessary for activating the amplifier produces only a negligible extra voltage difference across the tachometer terminals, compared to the voltage induced by the DC tachometer, which functions as the speed-signal transmitter N, because the internal resistance of the tachometer is comparatively low. There can therefore be measured across the generator terminals a voltage which is proportional to the motor speed, and by suitably calibrating the scale of a voltmeter there can be obtained an analog measurement of the rate of flow, in addition to the digital measurement.

On the other hand, for those cases where a very rapid response is not required of the flowmeter, the pressure difference sensor can be simplified by eliminating the proportional part, consisting of the hydrodynamic resistor 26, the spring 27, the slotted plate 20 and the photoresistance 30. As a result, the response time is increased several times over, and the instrument indicates the true gear pump speed only after several oscillations. However if this simplified arrangement is used, it becomes very important to obtain exactly the correct gap between the piston and the wall of the tube 17, the correct gap depending on the viscosity of the fluid, the time taken for the electric drive to respond, and the overall amplification factor of the system consisting of the optical slot, the photoresistance and the amplifier. It is necessary to use exactly the right gap width, in the first place to prevent the pump speed from oscillating continuously, and on the other hand to ensure that the entire system is not excessively damped. If the apparatus is equipped with the full proportional-integral system, the response time is only, for example, $50$ ms., a rapidity of response which is not approached by any of the known flowmeters of comparable type. Compared to this, an instrument containing only the integral part has a response time of about 500 ms. If the instrument contains only the integral part, the tube 17 containing the free piston 22 is installed in the outlet arm of the bypass, that is to say near the outlet drilling 13. The photoresistance 23 must take the place of the photoresistance 30, so that no reversal effect can take place. The terminals X and Y are connected together over a suitable fixed resistance, so as to obtain good adaptation to the preliminary stage transistor T. Suitable means are used to prevent the motor M from speeding up to full speed if the light source 19 fails.

The principle of photoelectronic control is particularly effective in the case where a gear pump is used to give the highest possible degree of speed stability. This is necessary in order to obtain a high measurement accuracy and a rapid transient response. The flow of fluid delivered by a gear pump is not only comparatively free from residual ripple, but is also very uniform as a function of the angle of rotation of the pump. Furthermore gear pumps can be manufactured with precision and at low cost right down to the smallest gear wheel diameters, so that even in the presence of very low rates of flow the pump speed (r.p.m.) is fairly high, and consequently a sufficiently high-pulse rate can be obtained for the operation of a digital flowmeter system, even if measurements are taken at frequent intervals. Digital measurement is an advantage, in the measuring instrument according to the invention, because the accuracy of better than $\pm 0.5$ percent obtainable by the process can be utilized over the entire measurement range.

To give a practical illustration of an application of the measurement technique, there was made a miniature gear pump which delivered fluid at the rate of 20 mm.$^3$ per revolution. This was coupled to a motor though a 1:5 reduction gear. On the shaft of the motor there was mounted a pulse disc, giving 120 pulses per revolution, corresponding to 30 pulses per mm.$^3$ of fluid passing through the pump. Assuming that the rate of flow is 20 mm.$^3$, the resulting pulse frequency is 600 pulses per second. Assuming a measurement accuracy better than $\pm 0.5$ percent, it is necessary to deliver at least 200 pulses to a frequency counter, for each reading. At the pulse frequency of 600 pulses per second, only approximately one-third of a second is required for delivering the 200 pulses. During this period the gear pump has rotated through only about one-third of a revolution. To obtain an accurate measurement of flow during this short period the pump must give a sufficiently even delivery of fluid. This requires a gear pump having more than 10 teeth on each gear wheel.

Figure 2A:
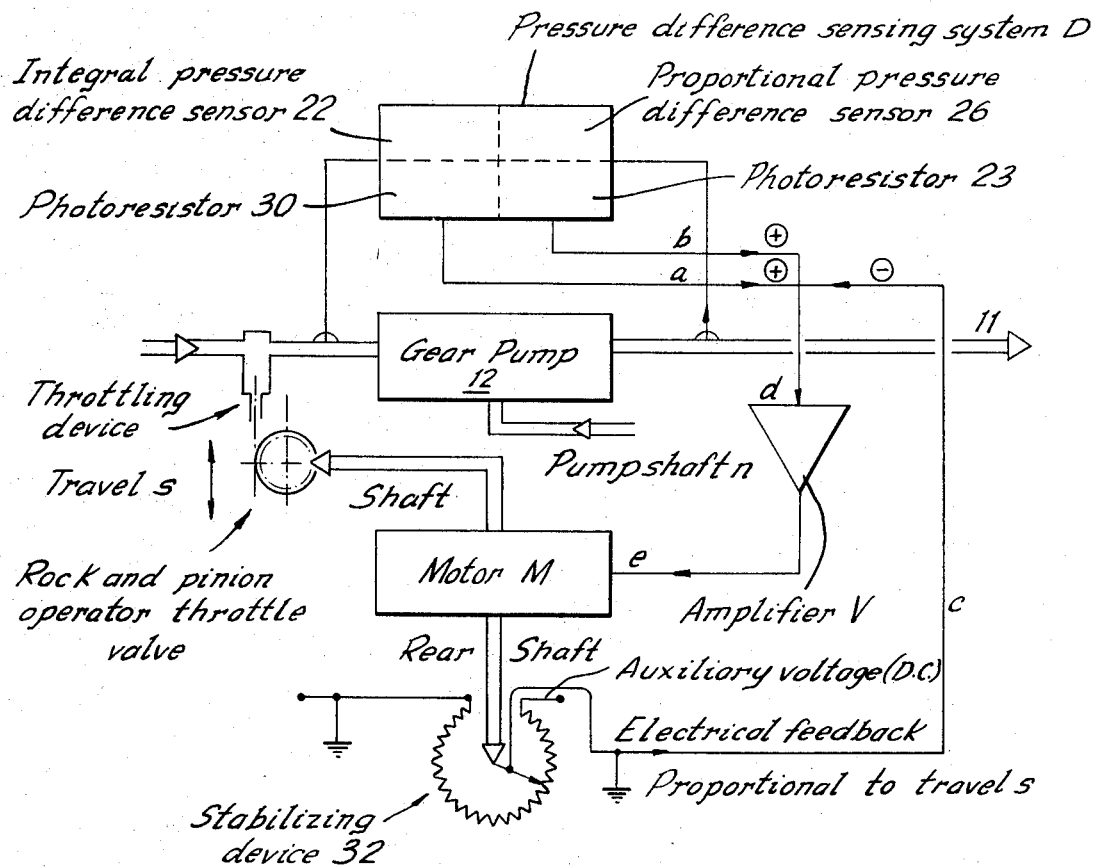
FIGS. 2a and 2b are block diagrams of different embodiments of FIG. 2.

The flowmeter can be used as an accurate flow controller simply by reversing the method of functioning. The accurate control of flow is obtained by rotating the gear pump at exactly the appropriate speed. The pressure difference detected by the pressure difference sensing system is held constant at zero by means of a throttling device 31, as shown in FIG. 2a, which can be situated either in front of or behind the pump. In this case the feedback tachometer N is replaced by a stabilizing device 32 in form of a conventional rotary potentiometer, for example, which delivers a DC signal proportional to the adjustment travels of the throttling device. The throttling device 31 is actuated over the amplifier V.

Figure 2B:
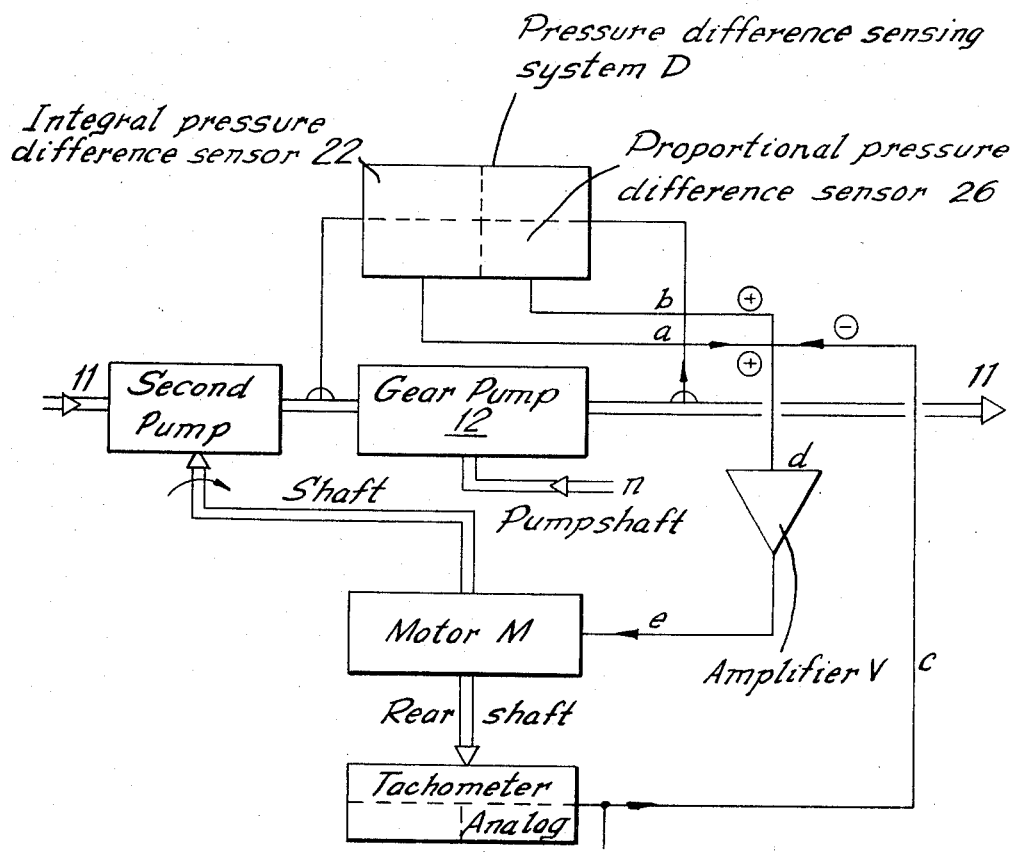

Alternatively, if desired there can be used, instead of the throttling device, a second pump 33, as shown in FIG. 2b interposed in the duct 11. This pump is driven by the motor M, which has been disconnected from the gear pump 12, at a speed such that the pressure difference across the gear pump 12 is maintained at zero.

Although in the example described above photoresistance were used, there can of course be chosen as an alternative photosemiconductors.

I claim:

1. Flow measuring and control apparatus, comprising a displacement flowmeter comprising a gear pump, an inlet side and an outlet side; a bypass for said flowmeter extending from the inlet side to the outlet side of said flowmeter; and speed-regulating means coupled to said gear pump for controlling the speed of said gear pump in a manner whereby the pressure difference between the inlet and outlet sides of said flowmeter is zero, said speed-regulating means comprising a motor coupled to said gear pump and pressure difference means in the bypass and coupled to said motor for controlling the speed of said motor in accordance with a pressure difference in said bypass, said pressure difference means including an integral pressure difference sensor for providing a signal proportional to the time integral of the pressure difference.

2. Flow measuring and control apparatus, comprising a displacement flowmeter comprising a gear pump, an inlet side and an outlet side; a bypass for said flowmeter extending from the inlet side to the outlet side of said flowmeter; and speed-regulating means coupled to said gear pump for controlling the speed of said gear pump in a manner whereby the pressure difference between the inlet and outlet sides of said flowmeter is zero, said speed-regulating means comprising a motor coupled to said gear pump and pressure difference means in the bypass and coupled to said motor for controlling the speed of said motor in accordance with a pressure difference in said bypass, said pressure difference means including a proportional pressure difference sensor and an integral pressure difference sensor hydraulically coupled in series with each other for providing a signal proportional to the pressure difference and a signal proportional to the time integral of the pressure difference.

3. Apparatus as claimed in claim 2, for precise flow control, further comprising a throttling device situated in a fluid duct upstream or downstream of said pump and adapted to respond to said pressure difference means, whereby the pressures across said gear pump are equalized, and means constantly controlling the speed of said gear pump to give the desired rate of fluid flow.

4. Apparatus as claimed in claim 2, further comprising a tachometer connected to the motor and an auxiliary pump within a fluid duct upstream or downstream of said pump, and wherein said motor is disconnected from said gear pump but is connected to the tachometer in such a way that the pressure difference across said gear pump is maintained at zero, said gear pump rotating constantly at the speed corresponding to the desired rate of fluid flow.

5. Apparatus as claimed in claim 2, wherein said gear pump and said pressure difference means are combined together in a single structural unit.

6. Apparatus as claimed in claim 5, wherein said bypass includes interconnecting ducts upstream and downstream of said gear pump.

7. Apparatus as claimed in claim 6, wherein said pressure difference means comprises a light source and a photoelectric device irradiated by said light source, and the integral pressure difference sensor of said pressure difference means comprises a free piston having the same density as fluid flowing through the bypass and adapted to move in said bypass between said light source and said photoelectric device whereby movement of said piston changes the light flux reaching said photoelectric device to provide a measurement of a time integral of the pressure difference across said gear pump.

8. Apparatus as claimed in claim 7, wherein said pressure difference means further comprises a housing and a second photoelectric device irradiated by said light source and the proportional pressure difference sensor of said pressure difference means comprises a hydrodynamic resistor within said bypass means and adapted to move between said light source and said second photoelectric device, and spring means affixing said hydrodynamic resistor to said housing, whereby movement of said hydrodynamic resistor changes the light flux reaching said second photoelectric device thereby providing a proportional pressure difference measurement.

9. Apparatus as claimed in claim 8, wherein said photoelectric devices are photoresistors.

10. Apparatus as claimed in claim 9, further comprising a transmitting tachometer connected to said motor, means producing a control voltage from the difference between a voltage produced by said photoresistors and a voltage produced by said tachometer, an amplifier, and means feeding said control signal through the amplifier to the motor to control said motor speed.

11. Apparatus as claimed in claim 10, further comprising a transistor electrically connected between the tachometer and said amplifier, and wherein the photoresistor of the integral pressure difference sensor is connected in parallel to the base-emitter path of said transistor.

12. Apparatus as claimed in claim 11, for flow measurement further comprising means coupling said tachometer to the shaft of said motor and means electrically countercoupling said tachometer to the input of said amplifier for the purpose of stabilizing said pump speed whereby the voltage across terminals of said tachometer are available for analog measurement of said fluid flow.

13. Apparatus as claimed in claim 9, wherein a single light source illuminates both photoresistors.

14. Apparatus as claimed in claim 13, wherein said pressure difference means further comprises first and second optical slots, said first slot being situated between said piston and the photoresistor of the integral pressure difference sensor, and said second slot being situated between said hydrodynamic resistor and the photoresistor of the proportional pressure difference sensor.

15. Apparatus as claimed in 14, wherein said second optical slot has a shorter effective length than said first optical slot.

* * * * *